UNITED STATES PATENT OFFICE.

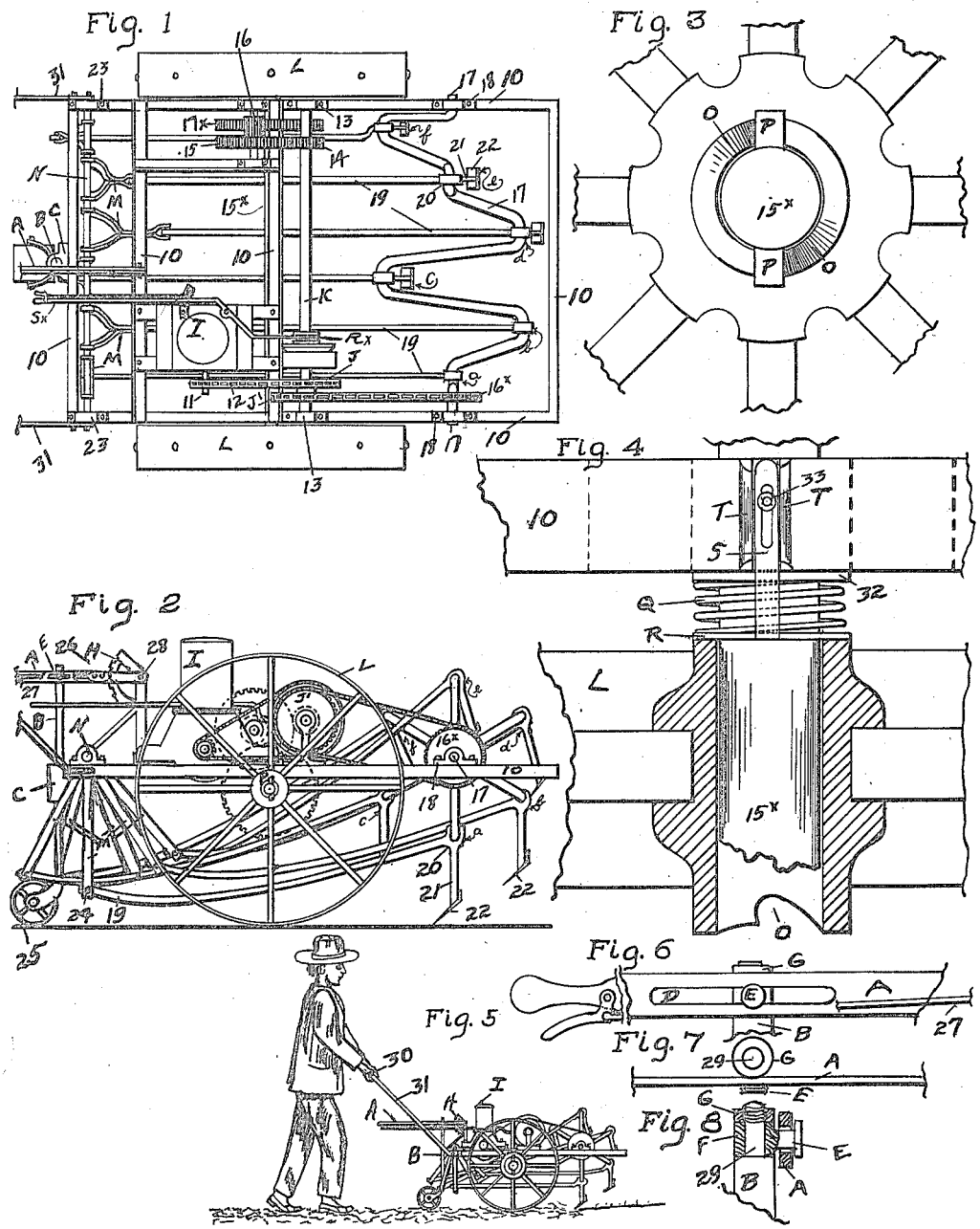

OTTO FRED ULLMAN, OF SEVERY, KANSAS.

HOEING-MACHINE.

1,228,992. Specification of Letters Patent. Patented June 5, 1917.

Application filed March 1, 1917. Serial No. 151,871.

*To all whom it may concern:*

Be it known that I, OTTO FRED ULLMAN, a resident of Severy, in the county of Greenwood and State of Kansas, have invented certain new and useful Improvements in Hoeing-Machines, of which the following is a description, referring to the accompanying drawings, which form a part of this specification.

The object of the invention is to provide a power driven mechanism adapted to hoe ground, duplicating the strokes and motions ordinarily given to a hand hoe for like work.

In the drawings: Figure 1 is a top view of the machine, with portions of the guiding arms and lever removed for lack of space. Fig. 2 is a side elevation of the machine seen in Fig. 1. Fig. 3 is a detailed face view of the hub of the large master wheel seen in Fig. 2. Fig. 4 is a sectional detailed drawing of portions of the master wheel, shaft and frame. Fig. 5 is a reduced drawing of the machine as seen in Fig. 2 showing the operator guiding the machine as it is being driven over the field. Fig. 6 is a detailed face view of sectional portions of the combination of parts comprising the lever device controlling the raising and lowering of the rear end of the machine to govern the desired depth of the hoes' entrance in the ground. Fig. 7 is a top view of a portion of Fig. 6. Fig. 8 shows sectional details of some of the parts shown in Fig. 6.

Similar numerals of reference indicate corresponding parts in all the figures of the drawings. Referring to the drawings, in Figs. 1, 2 and 5 is shown my improved hoeing machine in operation. At 10 is seen the frame of the machine. Mounted upon cross bars of the frame 10 is seen a gas engine I and from the crank shaft 11 thereof, a chain belt 12 engages a pulley at J which is attached to a shaft K housed at 13, 13 to the side rails of frame 10. This shaft K is in two parts, an intermediate clutch R$^x$ operated by the hand lever S$^x$ being introduced between same.

Through gears 14, 15, 16, 17$^x$ the engine driven shaft K transmits power to the main shaft 15$^x$ which drives the master wheels L. By means of a second pulley wheel J′ on shaft K a chain belt is driven engaging with the pulley wheel 16$^x$ located on a crank shaft 17 which is housed at 18, 18 to the side rails of frame 10. The shaft 17 in the drawings is forged similar to the crank shaft of a six cylinder gas engine, though the number of looped arms may be varied depending upon the desired number of hoe arms employed. In the drawings it will be noted that six hoe arms are respectively housed at the six looped points $a$, $b$, $c$, $d$, $e$, $f$ of the shaft 17. Each hoe arm comprises the handle 19, elbow boxing 20 and holder 21 depending therefrom and to which is attached a hoe blade 22. The parts 19, 20, 21 are preferably forged or fabricated as one piece. M indicates a series of six sets of rocker arms hingedly attached and mounted on the shaft N which is likewise housed at its ends 23, 23 in the frame 10. Each separate hoe arm handle 19 is shown pivotally attached as at 24 to a rocker arm M. It will be seen that as the shaft 17 is driven the looped points $b$, $d$, $e$, $f$, $c$ will force the corresponding blades 22 attached thereto to come in sequence to the position of the blade 22 attached to the looped point $a$ seen in Fig. 2, while the rocker arms M being adapted to swing to and fro, hold the handles 19 so that the blades 22 when properly adjusted are pulled into the ground by similar motion as ordinarily employed in using a hand hoe. The adjustment for cutting depth of the blades 22 is accomplished by lowering or raising the rear section of the frame. A perpendicular shaft B is housed in a long bearing C attached to a cross bar portion of frame 10. The shaft B terminates in a rear caster wheel 25 which rides on the ground. A lever bar A is provided with a dog 26 operated by a rod and spring 27, said dog engaging a segment ratchet H which is rigidly attached to the frame 10 to which also is hinged the lever A at 28. In Fig. 8 the top of shaft B is seen to terminate in an axle stem 29. Housed on this stem 29 is a collar F having a pin E projecting therefrom. The collar F is held on to the end of the shaft B by means of the nut G.

Referring to Fig. 6 it will be noted that the lever A is provided with a long slot D which houses the headed pin E of the collar F. It will now be seen that by raising or lowering the lever A that the shaft B will move up or down in the bearing C whereby the rear of frame 10 can be lowered toward or raised from the caster wheel 25, thus gaging the cutting depth of the blades 22. The slot D prevents binding of the pin E during such adjustments.

It will be seen that the caster wheel 25 may swivel since the shaft B may turn in the bearing C and collar F, thus the man in Fig. 5 can guide the machine by means of the handle or guide arm 30 attached to the side arms 31, 31 which are fastened to the side rails of the frame 10.

When the blades 22 come in contact with the ground the tendency is to pull the machine forward without dragging or cutting the ground. This tendency is overcome through the system of gear and chain transmission to the master wheels L which prevents the truck from being pulled forward by the driven blades 22. Therefore a steady travel is obtained and the ground cultivated as the machine travels in the direction indicated in Fig. 5.

The machine may be turned to the left or to the right since the wheels L are ratcheted to the shaft by means of ratchets O formed in the outer face of the hub boxing. The ratchet O forms a seat for the pin P located in the end of the shaft 15ˣ. A spring Q housed on shaft 15ˣ bears at one end against the shaft boxing 32 attached to the frame 10, the other end of spring Q bears against the hub boxing through a washer R which has an arm S rigidly attached thereto and which is adapted to slide with the motion of the machine in a guide T on the frame 10. This arm S has a slot through which a screw headed pin 33 is passed into the guide T to hold the arm S in proper place. It will be seen that the tendency of spring Q is to force the ratchet seat O against the driving pin P. It will be understood that any power means may be employed and such other modifications employed as lie within the scope of the appended claims.

Having fully described my invention what I now claim as new and desire to secure by Letters Patent is;

1. In a hoeing machine, a frame, an engine mounted thereupon, a main shaft housed in said frame, master wheels mounted on said shaft, a crank shaft housed in said frame, said shaft having a plurality of looped arms; gears driven by said engine for imparting rotary movement to said main and crank shafts; a shaft housed in said frame and a plurality of hingedly mounted rocker arms attached to said shaft; a series of hoe arms, each comprising a handle pivotally attached to one of said rocker arms, an elbow boxing engaging a looped arm of the crank shaft and a holder depending therefrom and a hoe blade attached to said holder, each elbow boxing of each of said hoe arms being adapted to follow the revolution of said crank shaft whereby the series of hoe blades are brought consecutively to an operative hoeing position adapted to enter and cultivate ground in the manner as specified; and a lever operating with a perpendicular shaft housed to the frame to raise or lower the rear of said frame to control the depth of penetration of said hoe blades.

2. In a hoeing machine, a frame, an engine mounted thereupon, a main shaft housed in said frame, master wheels mounted on said shaft, a crank shaft housed in said frame, said shaft having a plurality of looped arms; gears driven by said engine for imparting rotary movement to said main and crank shafts; a shaft housed in said frame and a plurality of hingedly mounted rocker arms attached to said shaft; a series of hoe arms, each comprising a handle pivotally attached to one of said rocker arms, an elbow boxing engaging a looped arm of the crank shaft and a holder depending therefrom and a hoe blade attached to said holder, each elbow boxing of each of said hoe arms being adapted to follow the revolution of said crank shaft whereby the series of hoe blades are brought consecutively to an operative hoeing position adapted to enter and cultivate ground in the manner as specified; and a lever operating with a perpendicular shaft housed to the frame to raise or lower the rear of said frame to control the depth of penetration of said hoe blades; a swiveling caster wheel attached to said perpendicular shaft, whereby the operator may control the direction of the machine during operation thereof; and a handle bar attached to said frame.

OTTO FRED ULLMAN.

Witnesses:
HAROLD HAYES,
J. F. HAYES.